(12) United States Patent
Suzuki et al.

(10) Patent No.: US 10,272,830 B2
(45) Date of Patent: Apr. 30, 2019

(54) IMAGE DISPLAY DEVICE (71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/890,963

(22) Filed: Feb. 7, 2018

(65) Prior Publication Data
US 2018/0257550 A1    Sep. 13, 2018

(30) Foreign Application Priority Data

Mar. 10, 2017 (JP) .................. 2017-046047

(51) Int. Cl.
*G08G 1/005* (2006.01)
*B60Q 1/50* (2006.01)
(Continued)

(52) U.S. Cl.
CPC .............. *B60Q 1/50* (2013.01); *B60Q 1/04* (2013.01); *G08G 1/005* (2013.01); *B60Q 2400/50* (2013.01); *G08G 1/166* (2013.01)

(58) Field of Classification Search
CPC ........... G06K 9/00798; G06K 9/00805; G06K 9/00825; G06K 9/629; H04N 7/181;
(Continued)

(56) References Cited

U.S. PATENT DOCUMENTS 5,654,705 A * 8/1997 Houten .................. G08G 1/095
116/63 R
6,662,108 B2  12/2003 Miller et al.
(Continued)

FOREIGN PATENT DOCUMENTS

EP         2233356 A1    9/2010
JP         11-263145 A   9/1999
(Continued)

OTHER PUBLICATIONS

Japanese Decision to Grant a Patent issued in corresponding Japanese Patent Application No. 2017-046045, dated Oct. 2, 2018, with English Translation.
(Continued)

*Primary Examiner* — Daniel Previl
(74) *Attorney, Agent, or Firm* — McDermott Will & Emery LLP (57) ABSTRACT

An image display device includes a light illuminator, a road-property detector, a road determiner, and an illumination controller. The light illuminator is configured to send out light frontward of a vehicle, to display an image on a road a pedestrian is going to cross. The road-property detector is configured to detect one or more road properties out of a plurality of road properties including a road shape, a road marking, and a road sign. The road determiner is configured to determine whether or not the road is permissible for the pedestrian to cross, on the basis of the one or more road properties. The illumination controller is configured to control display operation of the light illuminator, to keep the pedestrian from crossing the road, on the condition that the road determiner determines that the road is impermissible to cross.

10 Claims, 3 Drawing Sheets

(51) Int. Cl.
*B60Q 1/04* (2006.01)
*G08G 1/16* (2006.01)

(58) Field of Classification Search
CPC .... H04N 7/183; H04N 5/23216; H04N 5/247; B60T 7/12; B60T 2201/022; B60T 2210/32; B60T 2210/36; B60T 7/18; B60T 7/22
USPC ....... 340/944, 988, 989, 990, 907, 916, 917, 340/436, 425.5, 901, 905, 435, 925, 340/995.1, 995.24, 908, 573.1, 332
See application file for complete search history.

(56) References Cited

U.S. PATENT DOCUMENTS

| | | | |
|---|---|---|---|
| 8,269,652 B2 | 9/2012 | Seder et al. | |
| 8,954,252 B1 | 2/2015 | Urmson et al. | |
| 8,996,224 B1 | 3/2015 | Herbach et al. | |
| 9,135,754 B2* | 9/2015 | Ng-Thow-Hing | G06T 19/006 |
| 9,475,422 B2 | 10/2016 | Hillis et al. | |
| 9,558,409 B2 | 1/2017 | Pliefke et al. | |
| 9,575,176 B2 | 2/2017 | Baba | |
| 9,654,738 B1 | 5/2017 | Ferguson et al. | |
| 9,849,784 B1 | 12/2017 | Chan et al. | |
| 9,896,107 B1 | 2/2018 | Huang | |
| 9,902,311 B2 | 2/2018 | Sweeney et al. | |
| 9,905,132 B2 | 2/2018 | Habu | |
| 9,925,989 B2 | 3/2018 | Lee | |
| 9,947,221 B1 | 4/2018 | Mazzola | |
| 9,952,054 B2* | 4/2018 | An | G01C 21/34 |
| 9,969,326 B2 | 5/2018 | Ross et al. | |
| 9,978,280 B2 | 5/2018 | Lee et al. | |
| 9,988,047 B2 | 6/2018 | Johnson et al. | |
| 10,048,688 B2 | 8/2018 | Ramasamy | |
| 10,089,537 B2 | 10/2018 | Nix et al. | |
| 2002/0140555 A1* | 10/2002 | Jette | E05F 15/74 340/540 |
| 2005/0278098 A1 | 12/2005 | Breed | |
| 2006/0055525 A1 | 3/2006 | Kubota et al. | |
| 2007/0067081 A1 | 3/2007 | Ton | |
| 2008/0040004 A1 | 2/2008 | Breed | |
| 2008/0175012 A1 | 7/2008 | Shimaoka et al. | |
| 2008/0243389 A1 | 10/2008 | Inoue et al. | |
| 2008/0312832 A1 | 12/2008 | Greene et al. | |
| 2008/0312833 A1 | 12/2008 | Greene et al. | |
| 2009/0160678 A1 | 6/2009 | Turnbull | |
| 2010/0030474 A1 | 2/2010 | Sawada | |
| 2010/0082251 A1 | 4/2010 | Kogure | |
| 2011/0128139 A1 | 6/2011 | Tauchi et al. | |
| 2011/0184617 A1 | 7/2011 | Hegemann et al. | |
| 2012/0140988 A1 | 6/2012 | Takahashi | |
| 2012/0194356 A1 | 8/2012 | Haines et al. | |
| 2012/0224060 A1 | 9/2012 | Gurevich et al. | |
| 2013/0057690 A1 | 3/2013 | Mitsugi | |
| 2014/0062685 A1 | 3/2014 | Tamatsu et al. | |
| 2014/0152488 A1 | 6/2014 | Baba | |
| 2015/0103174 A1 | 4/2015 | Emura et al. | |
| 2015/0179073 A1 | 6/2015 | Suzuno | |
| 2015/0194082 A1 | 7/2015 | McEwan | |
| 2015/0334269 A1 | 11/2015 | Yokota et al. | |
| 2016/0039286 A1 | 2/2016 | Shibata et al. | |
| 2016/0093207 A1 | 3/2016 | Di Censo et al. | |
| 2016/0115650 A1* | 4/2016 | Leung | E01C 1/02 404/1 |
| 2016/0247393 A1 | 8/2016 | Okamoto et al. | |
| 2016/0332568 A1 | 11/2016 | Kim | |
| 2017/0043705 A1 | 2/2017 | Mizuno | |
| 2017/0140651 A1 | 5/2017 | Lee et al. | |
| 2017/0182934 A1 | 6/2017 | Arita et al. | |
| 2017/0210283 A1 | 7/2017 | Ishida | |
| 2017/0217361 A1 | 8/2017 | Miller | |
| 2017/0217368 A1 | 8/2017 | Lewis et al. | |
| 2017/0217422 A1 | 8/2017 | Nakamura | |
| 2017/0240096 A1 | 8/2017 | Ross | |
| 2017/0253177 A1* | 9/2017 | Kawamata | B60Q 1/50 |
| 2017/0253181 A1 | 9/2017 | Choi et al. | |
| 2017/0259734 A1 | 9/2017 | Imaishi et al. | |
| 2017/0276308 A1 | 9/2017 | Nakazawa et al. | |
| 2017/0330463 A1 | 11/2017 | Li et al. | |
| 2017/0337821 A1 | 11/2017 | Masuda et al. | |
| 2017/0372613 A1 | 12/2017 | Habu | |
| 2018/0009374 A1 | 1/2018 | Kim et al. | |
| 2018/0024562 A1 | 1/2018 | Bellaiche | |
| 2018/0025235 A1 | 1/2018 | Fridman | |
| 2018/0033306 A1 | 2/2018 | Kim et al. | |
| 2018/0086346 A1 | 3/2018 | Fujisawa et al. | |
| 2018/0118099 A1 | 5/2018 | Kunii et al. | |
| 2018/0118106 A1 | 5/2018 | You et al. | |
| 2018/0134286 A1 | 5/2018 | Yi et al. | |
| 2018/0141484 A1 | 5/2018 | Haneda et al. | |
| 2018/0173234 A1 | 6/2018 | Van Laack et al. | |
| 2018/0173237 A1 | 6/2018 | Reiley et al. | |
| 2018/0218601 A1 | 8/2018 | Aoki et al. | |
| 2018/0247540 A1 | 8/2018 | Hagawa et al. | |
| 2018/0250596 A1 | 9/2018 | Kim | |
| 2018/0253609 A1 | 9/2018 | Potter et al. | |
| 2018/0257547 A1 | 9/2018 | Suzuki et al. | |
| 2018/0257549 A1 | 9/2018 | Suzuki et al. | |
| 2018/0257550 A1 | 9/2018 | Suzuki et al. | |
| 2018/0261080 A1 | 9/2018 | Suzuki et al. | |
| 2018/0261081 A1 | 9/2018 | Suzuki et al. | |

FOREIGN PATENT DOCUMENTS

| | | |
|---|---|---|
| JP | 2006-252264 A | 9/2006 |
| JP | 2008-007079 A | 1/2008 |
| JP | 2008-143510 A | 6/2008 |
| JP | 2009-149152 A | 7/2009 |
| JP | 2009-230701 A | 10/2009 |
| JP | 4720650 B2 | 7/2011 |
| JP | 2013-203251 A | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 A | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Japanese Office Action issued in corresponding Japanese Patent Application No. 2017-046050, dated Aug. 7, 2018, with English Translation.
Japanese Office Action issued in corresponding Japanese Patent Application No. 2017-046052, dated Sep. 11, 2018, with English Translation.
Non-Final Office Action issued in related U.S. Appl. No. 15/877,859, dated Oct. 17, 2018.
Non-Final Office Action issued in related U.S. Appl. No. 15/888,791, dated Oct. 25, 2018.
Non-Final Office Action issued in related U.S. Appl. No. 15/877,901, dated Jun. 4, 2018.
Final Office Action issued in related U.S. Appl. No. 15/877,901, dated Oct. 30, 2018.
Japanese Office Action issued in corresponding Japanese Patent Application No. 2017-046047, dated Jul. 24, 2018, with English Translation.
Non-Final Office Action, dated Jan. 2, 2019, issued in related U.S. Appl. No. 15/890,918.
Notice of Allowance issued in related U.S. Appl. No. 151888,858, dated Feb. 8, 2019.
Notice of Allowance issued in related U.S. Appl. No. 151877,901, dated Feb. 20, 2019.
Japanese Office Action issued in corresponding Japanese Patent Application No. 2017-046049, dated Aug. 7, 2018, with English Translation.

(56) References Cited

OTHER PUBLICATIONS

Japanese Office Action issued in corresponding Japanese Patent Application No. 2017-046452, dated Aug. 21, 2018, with English Translation.
Non-Final Office Action issued in related U.S. Appl. No. 15/888,858, dated Jul. 24, 2018.
Japanese Office Action issued in corresponding Japanese Patent Application No. 2017-046045, dated Jul. 24, 2018, with English Translation.

* cited by examiner

IMAGE DISPLAY DEVICE

CROSS-REFERENCE TO RELATED APPLICATIONS

The present application claims priority from Japanese Patent Application No. 2017-046047 filed on Mar. 10, 2017, the entire contents of which are hereby incorporated by reference.

BACKGROUND

The technology relates to an image display device that sends out light frontward of an automobile, to display an image on a road.

Some image display devices send out light frontward of an automobile, to display an image on a road. For example, such image display devices display an image of permission to cross a road for a pedestrian, and thereby let the pedestrian know the driver's intention, attempting to allow the pedestrian to cross safely.

There have been pursuits of an image display device that clearly notifies the pedestrian of information, to give the pedestrian a prompt understanding of the image displayed on the road.

For example, Japanese Patent (JP-B) No. 4720650 proposes a road-surface projection device that gives an easily understandable warning to a moving body such as a pedestrian. If the pedestrian is in a determination region, the road-surface projection device projects an image on a road surface. The image includes a stop line, characters "STOP", and a crosswalk. This makes it possible to notify the pedestrian of information clearly.

SUMMARY

As described, in an image display device that sends out light frontward of an own vehicle, to display an image, it is desired to guide a pedestrian with enhanced safety.

It is desirable to provide an image display device that makes it possible to guide a pedestrian with enhanced safety.

An aspect of the technology provides an image display device including a light illuminator, a road-property detector, a road determiner, and an illumination controller. The light illuminator is configured to send out light frontward of a vehicle, to display an image on a road a pedestrian is going to cross. The road-property detector is configured to detect one or more road properties out of a plurality of road properties including a road shape, a road marking, and a road sign. The road determiner is configured to determine whether or not the road is permissible for the pedestrian to cross, on the basis of the one or more road properties detected by the road-property detector. The illumination controller is configured to control display operation of the light illuminator, to keep the pedestrian from crossing the road, on the condition that the road determiner determines that the road is impermissible to cross.

An aspect of the technology provides an image display device including a light illuminator, a road-property detector, and circuitry. The light illuminator is configured to send out light frontward of a vehicle, to display an image on a road a pedestrian is going to cross. The road-property detector is configured to detect one or more road properties out of a plurality of road properties including a road shape, a road marking, and a road sign. The circuitry is configured to control display operation of the light illuminator on the basis of a detection result of the road-property detector. The circuitry is configured to determine whether or not the road is permissible for the pedestrian to cross, on the basis of the one or more road properties detected by the road-property detector. The circuitry is configured to control the display operation of the light illuminator, to keep the pedestrian from crossing the road, on the condition that it is determined that the road is impermissible to cross.

DETAILED DESCRIPTION

In the following, some implementations of the technology are described with reference to the drawings.

[First Implementation]

Figure 1:
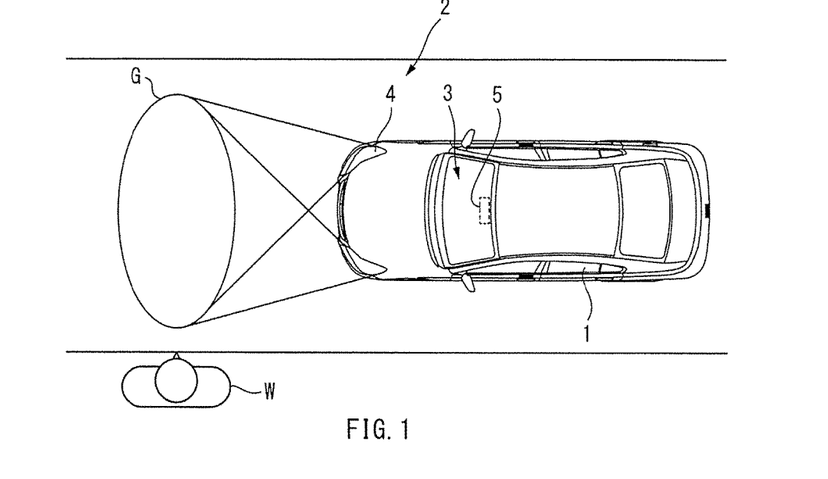
FIG. 1 illustrates a configuration of an automobile including an image display device according to a first implementation of the technology.

FIG. 1 illustrates a configuration of an automobile including an image display device according to a first implementation of the technology. The automobile may include an automobile body 1 and an image display device 2.

The automobile body 1 may include headlights and a front windshield. The headlights may be disposed in a front part of the automobile body 1. The front windshield may be disposed on front side of a driver's seat where a driver drives the automobile.

The image display device 2 may include an operation unit 3, a light illuminator 4, and a road-property detector 5. The operation unit 3 may be disposed near the driver's seat of the automobile body 1. The light illuminator 4 may be disposed in the front part of the automobile body 1. The road-property detector 5 may be disposed near an upper part of the front windshield.

The operation unit 3 may be a unit with which the driver performs an operation of the image display device 2.

The light illuminator 4 sends out light frontward of the automobile body 1, to display an image G on a road a pedestrian W is going to cross. The light illuminator 4 may be unitized with the headlights of the automobile body 1. The light illuminator 4 may display, for example, a permission-to-cross image and a no-crossing image on a road. The permission-to-cross image permits the pedestrian W to cross. The no-crossing image prohibits the pedestrian W from crossing.

For example, the permission-to-cross image may include, for example, image display of a crosswalk and character display of "Please Cross". For example, the no-crossing image may include, for example, image display of a stop line and character display of "No Crossing".

It is to be noted that the term "pedestrian W" means, for example, a person who passes along a sidewalk, and a person who rides a bicycle along a road end.

The road-property detector 5 may detect a public road property of the road. Specifically, the road property may include a road shape, a road marking, and a road sign. The road marking is a sign marked on the road, e.g., an outline of a driveway, a lane borderline, a centerline of the driveway, and a no-crossing figure. The road sign is a display board provided to display a road regulation. Non-limiting examples may include a sign indicating no-crossing and a sign indicating an expressway. Moreover, the road-property detector 5 may include, for example, a camera, and be able to detect the road property on the basis of images captured by the camera.

Description is given next of details of the image display device 2.

Figure 2:
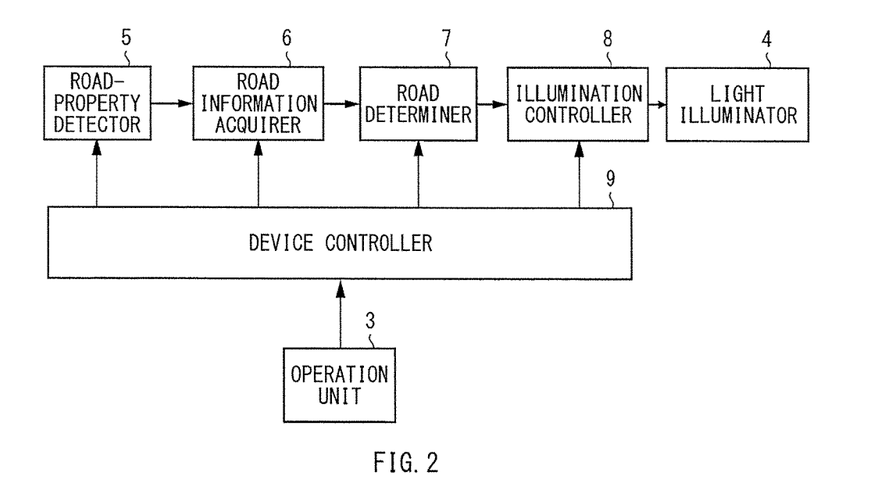
FIG. 2 is a block diagram of a configuration of the image display device.

Referring to FIG. 2, the image display device 2 may include a road information acquirer 6. The road information acquirer 6 may be coupled to the road-property detector 5. The road information acquirer 6 may be coupled to the light illuminator 4 through a road determiner 7 and an illumination controller 8. A device controller 9 may be coupled to the road-property detector 5, the road information acquirer 6, the road determiner 7, and the illumination controller 8. The operation unit 3 may be coupled to the device controller 9.

The road information acquirer 6 may acquire road information on the basis of the road property detected by the road-property detector 5. The road information may indicate a road size and the road regulation. The road information indicating the road size may include, for example, a road width, and the number of lanes of the road. The road information indicating the road regulation may include, for example, information indicating no-crossing, and information indicating the expressway.

The road determiner 7 may determine whether or not the road as a target of determination is permissible for the pedestrian W to cross, on the basis of the road information acquired by the road information acquirer 6. In other words, the road determiner 7 may determine that the road is permissible for the pedestrian W to cross, in a case where the road size is smaller than a predetermined value. The road determiner 7 may determine that the road is impermissible for the pedestrian W to cross, in a case where the road size is larger than the predetermined value. Moreover, the road determiner 7 may determine that the road is permissible for the pedestrian W to cross, in a case where the road information indicating no-crossing is not acquired. The road determiner 7 may determine that the road is impermissible for the pedestrian W to cross, in a case where the road information indicating no-crossing is acquired.

In one implementation of the technology, the road determiner 7 may serve as a "road determiner" and "circuitry".

The illumination controller 8 may control the light illuminator 4 to display the no-crossing image, in a case where the road determiner 7 determines that the road is impermissible to cross. The no-crossing image prohibits the pedestrian W from crossing the road. In a case where the road determiner 7 determines that the road is permissible to cross, the illumination controller 8 may control the light illuminator 4 in accordance with the operation performed with the operation unit 3.

In one implementation of the technology, the illumination controller 8 may serve as an "illumination controller" and the "circuitry".

The operation unit 3 may allow the driver who drives the automobile body 1 to operate the light illuminator 4 through the device controller 9.

The device controller 9 may perform a control of each unit in the image display device 2 on the basis of various operation signals inputted from the operation unit 3.

It is to be noted that the road information acquirer 6, the road determiner 7, the illumination controller 8, and the device controller 9 may include a central processing unit (CPU) and an operation program that causes the CPU to perform various kinds of processing. However, the road information acquirer 6, the road determiner 7, the illumination controller 8, and the device controller 9 may include a digital circuit.

Description now moves on to operation according to the first implementation.

Figure 3:
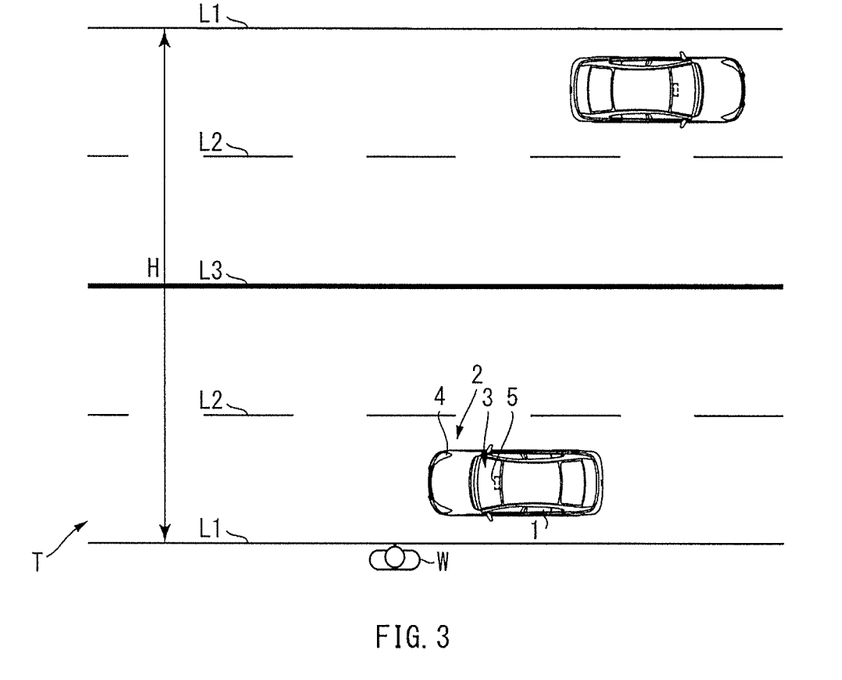
FIG. 3 illustrates how a road-property detector detects road properties.

First, as illustrated in FIG. 3, the driver who drives the automobile body 1 causes the automobile to stop in front of the pedestrian W who waits to cross the road. Thereafter, the driver operates the operation unit 3, to allow the light illuminator 4 to display the permission-to-cross image for the pedestrian W.

Thus, with operational information being inputted to the device controller 9 from the operation unit 3, the road-property detector 5 may detect, under a control of the device controller 9, the road properties indicating the road size and the road regulation. The road-property detector 5 may detect, for example, the outlines L1 of the driveway, as the road property indicating the road size. The outlines L1 of the driveway may be provided on both sides of the road. Moreover, the road-property detector 5 may also detect a lane T of the road, as the road property indicating the road size, on the basis of the outlines L1 of the driveway, the lane borderlines L2, and the centerline L3 of the driveway. The road property thus detected may be outputted to the road information acquirer 6 from the road-property detector 5.

That way, with the road property indicating the road size being inputted to the road information acquirer 6, the road information acquirer 6 may acquire the road information indicating the road size, on the basis of the road property. The road information acquirer 6 may be able to acquire the road width H, as the road information, on the basis of positions of the outlines L1 of the driveway provided on both sides of the road. The road information acquirer 6 may also be able to acquire the number of the lanes T, as the road information, on the basis of the lane T of the road. The road information thus acquired may be supplied to the road determiner 7 from the road information acquirer 6.

Supplied with the road information indicating the road size from the road information acquirer 6, the road determiner 7 may determine, on the basis of the road information, whether or not the road as the target of the determination is permissible for the pedestrian W to cross. In other words, the road determiner 7 may determine that the road is permissible for the pedestrian W to cross, in a case where the road width H is smaller than the predetermined value. The road determiner 7 may determine that the road is impermissible for the pedestrian W to cross, in a case where the road width H is larger than the predetermined value. Moreover, the road determiner 7 may determine that the road is permissible for the pedestrian W to cross, in a case where the number of the lanes T is smaller than a predetermined value. The road determiner 7 may determine that the road is impermissible for the pedestrian W to cross, in a case where the number of the lanes T is larger than the predetermined value.

In general, in displaying the permission-to-cross image for the pedestrian W, the driver who drives the automobile body 1 may possibly become too concentrated on a state of a surrounding vehicle that is approaching, to check the road size. Allowing the road determiner 7 to automatically determine whether or not the road is permissible for the pedestrian W to cross, on the basis of the road property indicating the road size makes it possible to guide the pedestrian W with enhanced safety.

It is to be noted that in one preferred but non-limiting example, the road determiner 7 may determine whether or not the road is permissible for the pedestrian W to cross, with reference to a road size at which traffic becomes heavy.

For example, the road determiner 7 may determine that the road is permissible for the pedestrian W to cross, in a case where the road width H is equal to or smaller than 14 meters. The road determiner 7 may determine that the road is impermissible for the pedestrian W to cross, in a case where the road width H is larger than 14 meters. Moreover, the road determiner 7 may determine that the road is permissible for the pedestrian W to cross, in a case where the number of the lanes T is smaller than two on each side. The road determiner 7 may determine that the road is impermissible for the pedestrian W to cross, in a case where the number of the lanes T is equal to or larger than two on each side. In general, the road having the road width H of 14 meters or more, or the road having the number of the lanes T of two or more on each side, tends to have heavy traffic. Determining, with reference to the road size, whether or not the road is permissible for the pedestrian W to cross makes it possible to guide the pedestrian W with more enhanced safety.

Here, in the example of FIG. 3, because the road includes two or more lanes on each side, the road determiner 7 may determine that the road is impermissible for the pedestrian W to cross, and output a result of the determination to the illumination controller 8.

Because the road determiner 7 has determined that the road is impermissible for the pedestrian W to cross, the illumination controller 8 may control the light illuminator 4 to compulsively display the no-crossing image on the road, regardless of the operation performed with the operation unit 3. It is to be noted that in a case where the road determiner 7 determines that the road is permissible for the pedestrian W to cross, the illumination controller 8 may allow the light illuminator 4 to display the permission-to-cross image on the road, in accordance with the operation performed with the operation unit 3.

As described, in the image display device 2, the determination may be made as to whether or not the road is permissible for the pedestrian W to cross, on the basis of the road property detected by the road-property detector 5. Hence, it is possible to guide the pedestrian W with enhanced safety. However, for example, in the road-surface projection device as in JP-B No. 4720650, the image to be displayed on the road is selected regardless of the road property such as the road shape, the road marking, and the road sign. This makes it difficult to guide the pedestrian with enhanced safety. For example, displaying the permission-to-cross image on a road having a large width may contribute to possibility that the pedestrian is prompted to cross the road with heavy traffic. In contrast, in the image display device 2, the determination may be made as to whether or not the road is impermissible for the pedestrian W to cross, on the basis of the road property detected by the road-property detector 5. This makes it possible to determine that the road is impermissible for the pedestrian W to cross, in a case where, for example, the road has a large width, and to display the no-crossing image on the road. As a result, in the image display device 2, it is possible to guide the pedestrian W with enhanced safety.

In this implementation, in the case where the determination is made that the road is impermissible for the pedestrian W to cross, on the basis of the road property detected by the road-property detector 5, the illumination controller 8 may control the light illuminator 4 to display the no-crossing image on the road. Hence, it is possible to guide the pedestrian with enhanced safety.

[Second Implementation]

In the first implementation, the road-property detector 5 may also detect the road property indicating the road regulation.

Figure 4:
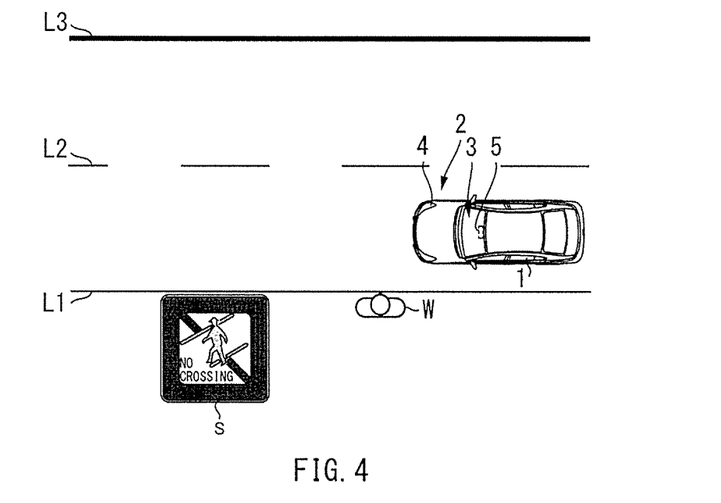
FIG. 4 illustrates how a road-property detector according to a second implementation detects road properties.

For example, as illustrated in FIG. 4, the road-property detector 5 may detect the road sign S indicating no-crossing, as the road property.

The road information acquirer 6 may acquire the road information indicating the road regulation displayed on the road sign S, on the basis of the road sign S detected by the road-property detector 5.

The road determiner 7 may determine whether or not the road as the target of the determination is permissible for the pedestrian W to cross, on the basis of the road information acquired by the road information acquirer 6. In other words, the road determiner 7 may determine that the road is permissible for the pedestrian W to cross, in a case where the road information indicating no-crossing is not acquired. The road determiner 7 may determine that the road is impermissible for the pedestrian W to cross, in a case where the road information indicating no-crossing is acquired.

Thus, the road property indicating the road regulation indicates a public regulation. Determining, on the basis of such a road property, whether or not the road is permissible for the pedestrian W to cross makes it possible to guide the pedestrian W with more enhanced safety.

In this implementation, the road determiner 7 may determine whether or not the road is permissible for the pedestrian W to cross, on the basis of the road sign detected by the road-property detector 5. Hence, it is possible to guide the pedestrian with more enhanced safety.

[Third Implementation]

In the first and the second implementations, in one preferred but non-limiting example, the road-property detector 5 may detect a plurality of the road properties. In a case where the road determiner 7 determines, on the basis of at least one road property, that the road is impermissible to cross, the illumination controller 8 may control the light illuminator 4 to keep the pedestrian W from crossing the road.

Figure 5:
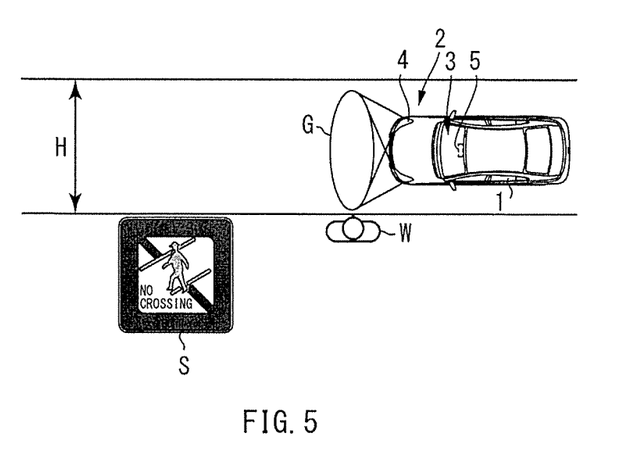
FIG. 5 illustrates how a road-property detector according to a third implementation detects road properties.

For example, as illustrated in FIG. 5, on a road that has a small road width and is provided with the road sign S indicating no-crossing, the road-property detector 5 may detect both the road property indicating the road size and the road property indicating the road regulation.

The road information acquirer 6 may acquire the road information indicating the road size and the road information indicating the road regulation, on the basis of the road properties detected by the road-property detector 5. In other words, the road information acquirer 6 may acquire the road information indicating the road width H and the road information indicating no-crossing.

The road determiner 7 may determine whether or not the road as the target of the determination is permissible for the pedestrian W to cross, on the basis of each piece of the road information acquired by the road information acquirer 6. In other words, the road determiner 7 may determine that the road is permissible for the pedestrian W to cross, on the basis of the road information indicating the road width H, because the road width H is smaller than 14 meters. But the road determiner 7 may determine that the road is impermissible for the pedestrian W to cross, on the basis of the road information indicating no-crossing.

In a case where the road determiner 7 determines, on the basis of at least one road property, that the road is impermissible to cross, the illumination controller 8 may control the light illuminator 4 to display the no-crossing image on the road. Here, the road determiner 7 may determine, on the basis of the road information indicating the road width H, that the road is permissible for the pedestrian W to cross, but determine, on the basis of the road information indicating no-crossing, that the road is impermissible to cross. Accordingly, the illumination controller 8 may control the light illuminator 4 to display the no-crossing image on the road.

In this implementation, in the case where the road determiner 7 determines that the road is impermissible to cross, on the basis of at least one road property, the illumination controller 8 may control the light illuminator 4 to display the no-crossing image on the road. Hence, it is possible to guide the pedestrian W with more enhanced safety.

[Fourth Implementation]

In the first to the third implementations, in the case where the road determiner 7 determines that the road is impermissible to cross, the illumination controller 8 may control the light illuminator 4 to display the no-crossing image on the road. However, this is non-limiting, insofar as the illumination controller 8 is able to control display operation of the light illuminator 4 to keep the pedestrian W from crossing the road.

For example, in the case where the road determiner 7 determines that the road is impermissible to cross, the illumination controller 8 may make the light illuminator 4 stop sending out light. In other words, the illumination controller 8 may make the light illuminator 4 compulsively stop displaying the image G, regardless of the operation performed with the operation unit 3. This makes it possible to allow the pedestrian W to recognize that they are not permitted to cross the road, and to allow the driver who operates the operation unit 3 to recognize that it the road is impermissible to cross. Hence, it is possible to guide the pedestrian W with more enhanced safety.

In this implementation, in the case where the road determiner 7 determines that the road is impermissible to cross, the illumination controller 8 may make the light illuminator 4 stop sending out light. Hence, it is possible to guide the pedestrian with more enhanced safety.

It is to be noted that in the first to the fourth implementations as described above, the road-property detector 5 may actually make a measurement of the road with the use of, for example, a camera, to detect the road property. However, the road-property detector 5 is not limited to what actually makes the measurement of the road, but may be anything that is able to detect the road property.

For example, the road-property detector 5 may store in advance positional information of the road properties with respect to the road. The road-property detector 5 may be able to detect the road properties on the basis of the stored positional information of the road properties and on the basis of positional information of the own vehicle. As the road-property detector 5, for example, a car navigation system may be used.

Moreover, in the first to the fourth implementations as described above, the operation unit 3 may be eliminated. In other words, the illumination controller 8 may automatically select, on the basis of the result of the determination by the road determiner 7, the image G to be displayed on the road. The illumination controller 8 may control the light illuminator 4 to display the image G thus selected.

Furthermore, in the first to the fourth implementations as described above, the light illuminator 4 may be unitized with the headlights of the automobile body 1. However, the light illuminator 4 may be disposed separately from the headlights. The light illuminator 4 may include various kinds of light sources, e.g., a lamp, a light emitting diode (LED), a digital mirror device, and a projector.

In one implementation described above, the road determiner 7 and the illumination controller 8 illustrated in FIG. 2 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the road determiner 7 and the illumination controller 8. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 2.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An image display device, comprising:
   a light illuminator configured to display an image on a road;
   a detector configured to detect one or more road properties;
   a controller configured to:
   determine, based on the one or more road properties, a road size of the road on which a vehicle is traveling, the road size including at least one of a road width of the road or a number of lanes of the road;
   determine whether the road is impermissible for a pedestrian to cross based on determining that the road size meets a threshold; and
   project, using the light illuminator, the image on the road in response to determining that the road is impermissible for the pedestrian to cross based on the detected road size meeting the threshold, the image prompting the pedestrian to refrain from crossing the road.

2. The image display device according to claim 1, wherein the controller:
   determines whether the road is impermissible for the pedestrian to cross based on determining that the road width meets a first width, and
   projects, using the light illuminator, the image on the road in response to determining that the road is impermissible for the pedestrian to cross based on determining that the road width meets the first width, the image prompting the pedestrian to refrain from crossing the road.

3. The image display device according to claim 1, wherein the controller:
  determines whether the road is impermissible for the pedestrian to cross based on determining that the number of lanes meets a first number of lanes, and
  projects, using the light illuminator, the image on the road in response to determining that the road is impermissible for the pedestrian to cross based on determining that the number of lanes meets the first number of lanes, the image prompting the pedestrian to refrain from crossing the road.

4. The image display device according to claim 3, wherein the light illuminator includes headlights.

5. The image display device according to claim 1, wherein the detector detects a road regulation of the road, and the controller:
  determines whether the road is impermissible for the pedestrian to cross based on determining that the road regulation indicates no-crossing, and
  projects, using the light illuminator, the image on the road in response to determining that the road is impermissible for the pedestrian to cross based on the detected road regulation indicating no-crossing, the image prompting the pedestrian to refrain from crossing the road.

6. The image display device according to claim 5, wherein the controller projects, using the light illuminator, the image on the road in response to determining that the road is impermissible for the pedestrian to cross based on the detected road size meeting the threshold and the detected road regulation indicating no-crossing, the image prompting the pedestrian to refrain from crossing the road.

7. The image display device according to claim 6, wherein the image projected by the light illuminator is a no-crossing image for prohibiting the pedestrian from crossing the road.

8. The image display device according to claim 1, wherein the image projected by the light illuminator is a no-crossing image for prohibiting the pedestrian from crossing the road.

9. The image display device according to claim 1, wherein the light illuminator includes headlights.

10. An image display device, comprising:
  a light illuminator configured to send light frontward of a vehicle to display an image on a road on which the vehicle is traveling and a pedestrian crosses;
  a detector configured to detect one or more road properties; and
  circuitry configured to:
    determine, based on the one or more road properties, a road size of the road on which the vehicle is traveling, the road size including at least one of a road width of the road or a number of lanes of the road;
    determine that the road is impermissible for the pedestrian to cross based on determining that either the road size meets a threshold; and
    project, using the light illuminator, the image on the road in response to determining that the road is impermissible for the pedestrian to cross based on the detected road size meeting the threshold, the image prompting the pedestrian to refrain from crossing the road.

* * * * *